United States Patent [19]

Alferness et al.

[11] Patent Number: 5,243,669
[45] Date of Patent: Sep. 7, 1993

[54] ASYMMETRIC, PERIODICALLY LOADED WAVEGUIDE FOR POLARIZATION ROTATION

[75] Inventors: Rodney C. Alferness; Thomas L. Koch, both of Holmdel, N.J.; Yosi Shani, Ramat-Hen, Israel

[73] Assignee: AT&T Bell Laboratories, Murray Hill, N.J.

[21] Appl. No.: 864,739

[22] Filed: Apr. 7, 1992

[51] Int. Cl.$^5$ ............................................. G02F 1/01
[52] U.S. Cl. ......................................... 385/11; 359/483
[58] Field of Search ........................... 359/483; 385/11

[56] References Cited

U.S. PATENT DOCUMENTS

| | | | |
|---|---|---|---|
| 4,400,813 | 8/1993 | Kaminow | 372/45 |
| 4,606,605 | 8/1986 | Ashkin et al. | 385/11 |
| 4,966,431 | 10/1990 | Heismann | 385/11 |
| 4,988,169 | 1/1991 | Walker | 385/11 X |

OTHER PUBLICATIONS

"Electrooptic Polarization Modulation in Multielectrode $Al_xGa_{1-x}As$ Rib Waveguides" by Reinhart et al by IEEE J. of Quantum Electronics, vol. QE-18, No. 4, Apr. 1982, pp. 763–766.

R. C. Alferness et al., Optics Lett., vol. 7, No. 10, Oct. 1982, "High-speed waveguide electro-optic . . . ," pp. 500–502.

T. Okoshi, J. of Lightwave Tech., vol. LT-3, No. 6, Dec. 1985, "Polarization-state control schemes . . . ," pp. 1232–1237.

M. Schlak et al., Elec. Letts., vol. 22, No. 17, Aug. 14, 1986, "Integrated-optic polarization converter . . . ," pp. 883–885.

M. Schlak et al., IEEE Photonics Tech. Lett., vol. 3, No. 1, Jan. 1991, "Tunable TE/TM-Mode Converter . . . ," pp. 15–16.

H. Heidrich et al., IEEE Photonics Tech. Lett., vol. 4, No. 1, Jan. 1992, "Passive Mode Converter with a Periodically . . . ," pp. 34–36.

*Primary Examiner*—Akm E. Ullah
*Attorney, Agent, or Firm*—Gregory C. Ranieri

[57] ABSTRACT

Polarization rotation is achieved in an exemplary embodiment in an optical waveguide by augmenting the waveguide structure with a plurality of spaced-apart sections for loading the refractive index of the waveguide to cause a lateral asymmetry in the refractive index profile of the waveguide viewed in the plane transverse to the waveguide longitudinal axis. Each spaced-apart section induces non-zero coupling between the principal orthogonal polarization modes. Phase matched coupling between the principal orthogonal polarization modes is achieved by spacing the sections periodically by a distance $\Lambda$ equal to $\lambda/\Delta N$ where $\lambda$ is the propagation wavelength in the waveguide and $\Delta N$ is the difference between the effective refractive indices for the principal orthogonal polarization modes. Realizations of the waveguide structure are shown using Group III–V semiconductor rib waveguide structures.

12 Claims, 7 Drawing Sheets

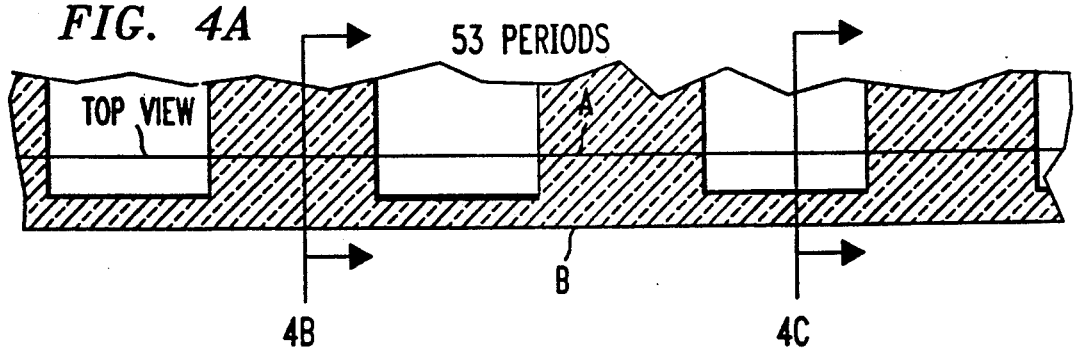
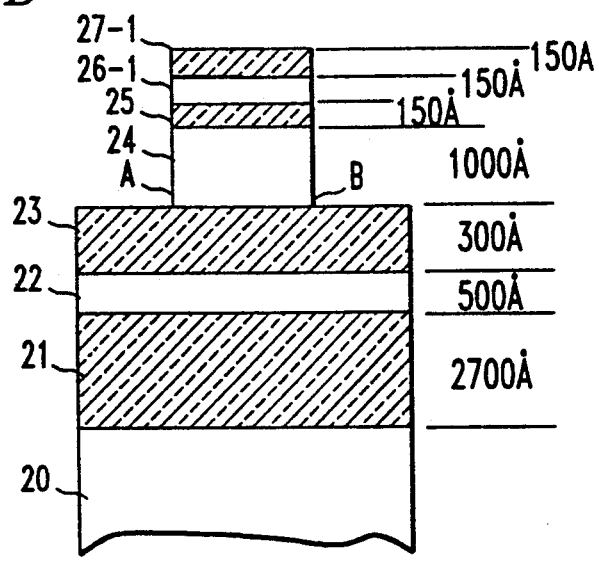
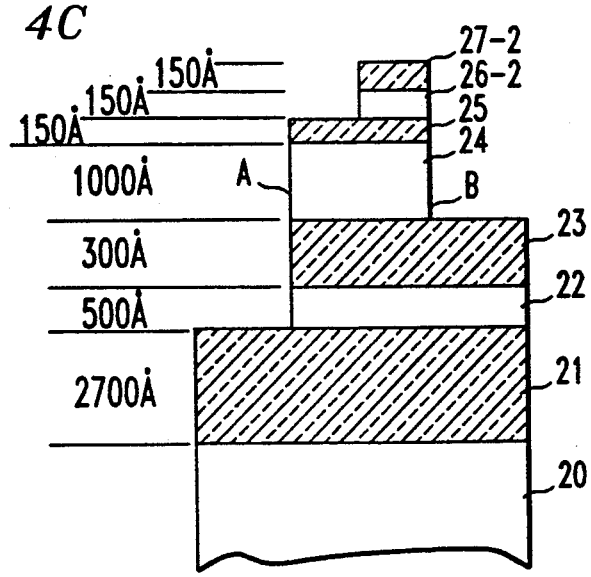

ASYMMETRIC, PERIODICALLY LOADED WAVEGUIDE FOR POLARIZATION ROTATION

TECHNICAL FIELD

This invention relates to lightwave devices and, more particularly, to waveguide devices for performing polarization rotation.

BACKGROUND OF THE INVENTION

Polarization rotation is an important effect in integrated lightwave systems. Some elements of the lightwave system expect to receive their inputs in certain desirable polarizations. Other elements have a requirement for performing a polarization rotation on their received inputs signals. For example, balanced polarization diversity heterodyne receivers require 45° rotation whereas polarization controllers require a dynamic rotation capability as large as 90°.

Polarization rotation has been demonstrated in both lithium niobate ($LiNbO_3$) waveguide devices and in semiconductor group III-V waveguide devices. In the lithium niobate devices, periodically etched silicon dioxide films have been applied over the waveguide to induce a periodic stress for changing the refractive index of the waveguide via the photo-elastic effect. See, for example, K. Yamanouchi et al., *IEEE J. Quantum Electronics*, Vol. QE-16, No. 6, pp. 628-34 (1980). Generally, lithium niobate devices utilize the electrooptic effect to achieve polarization rotation. See, for example, U.S. Pat. No. 4,966,431 issued to F. Heismann on Oct. 30, 1990. For the semiconductor devices, polarization rotation has been demonstrated by using periodic electrodes in conjunction with the electrooptic effect. See, for example, F. Reinhart et al., *IEEE J. Quantum Electronics*, Vol. QE-18, No. 4, pp. 763-6 (1982) and M. Schlak et al., *Electronics Lett.*, Vol. 22, pp. 883-5 (1986). Operation of the semiconductor devices generally requires application of large voltages with, in some devices, a maximum rotation capability much less than 90°.

SUMMARY OF THE INVENTION

Polarization rotation is achieved in an optical waveguide by augmenting the waveguide structure with a plurality of spaced-apart sections for loading the refractive index of the waveguide to cause a lateral asymmetry in the refractive index profile of the waveguide viewed in the plane transverse to the waveguide longitudinal axis. Each spaced-apart section induces non-zero coupling between the principal orthogonal polarization modes. Phase matched coupling between the principal orthogonal polarization modes is achieved by spacing the sections periodically by a distance $\Lambda$ equal to $\lambda/\alpha N$ where $\lambda$ is the propagation wavelength in the waveguide and $\Delta N$ is the difference between the effective refractive indices for the principal orthogonal polarization modes.

In an embodiment, a polarization rotation waveguide device is realized with periodic spaced-apart sections disposed on only one side of the waveguide. Periodic is contemplated to include substantially periodic as well as chirped periodic and multiple periodic.

In another embodiment, two different pluralities of sections are disposed on opposite sides of the waveguide and substantially interleaved with each other along the longitudinal axis of the waveguide to maintain the required asymmetric loading of the waveguide.

In another embodiment, one or more sections are disposed along the waveguide to produce the required asymmetric loading.

Realizations of the waveguide structure are shown using Group III-V semiconductor rib waveguide structures.

BRIEF DESCRIPTION OF THE DRAWING

A more complete understanding of the invention may be obtained by reading the following description of specific illustrative embodiments of the invention in conjunction with the appended drawing in which.

The devices shown in the figures have not been drawn to scale in order to permit a better understanding of the devices to be obtained.

DETAILED DESCRIPTION

Polarization rotation is achieved in accordance with the principles of the invention by creating an asymmetry in one or both of the transverse dimensions of a waveguide. The asymmetry, which can be made periodic, perturbs the primary axes of the waveguide thereby resulting in a non-zero coupling coefficient between the principal waveguide modes, TE and TM. Periodic application of the asymmetry and, therefore, the perturbation allows coherent accumulation of the light in the converted (desired output) polarization.

For the following description, TE and TM modes which are also referred to as TE and TM polarizations refer to the orientation of the electric field parallel and perpendicular to the epitaxial layers, respectively. Polarization rotation is then measured as the ratio of the amount of TM (TE) output polarized light to the total amount of output light when a TE (TM) polarization of input light is launched into the device.

Figure 1A:
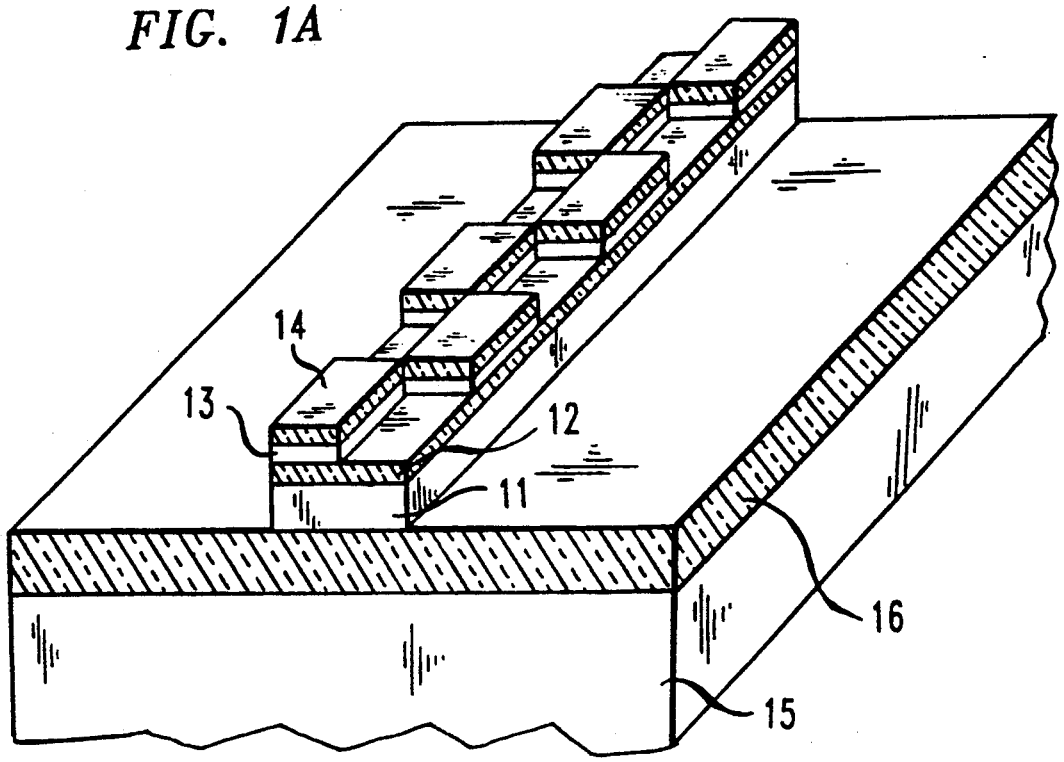
FIGS. 1(*a*), and 2(*b*) and 4(*a*), (*b*), and (*c*), and 6(*a*), (*b*) and (*c*), show multiple views of different embodiments of an asymmetric, periodically loaded waveguide for polarization rotation realized in accordance with the principles of the present invention described below.
Figure 1B:
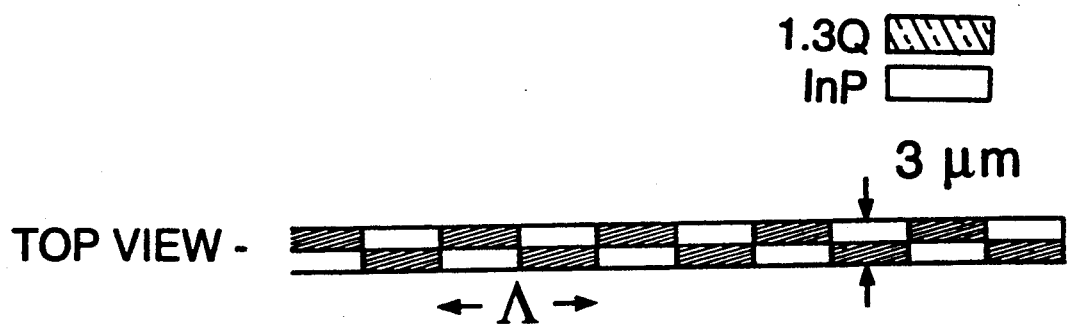

FIG. 1 shows schematically an exemplary asymmetric waveguide including a longitudinally periodic perturbation. The waveguide includes a high refractive index, core guiding layer 16, lower cladding layer 15 of lower refractive index material, and layers 12 and 14 which include high refractive index material for the rib loading of the guiding layer and additional material for appropriate asymmetric loading the waveguide. The individual perturbation sections in layers 13 and 14 locally alter lateral confinement of optical signals in the waveguide via rib loading and contribute to the asymmetry and longitudinally periodic loading of the waveguide utilized in polarization rotation. Layers 11 and 13 are thin, lower index layers used primary as stop-etch planes with selective chemical etchants during fabrication.

The waveguide loading layers 11, 12, 13, and 14 are grown and fabricated as a rib atop the device substrate including layers 15 and 16. Layers 11, 13, and 15 are grown as InP layers using metal-organic vapor phase epitaxial growth techniques. Layers 12, 14, and 16 are grown as quaternary layers of InGaAsP having a bandgap wavelength of approximately 1.3 $\mu$m. These layers are denoted in FIG. 1 as comprising 1.3 Q. Growth of layers 12, 14, and 16 is also accomplished using metallic-organic vapor phase epitaxy.

Substrate layer 15 is (001)-oriented. The waveguide (layers 11–14) is oriented so that its longitudinal axis coincides with the (110) crystallographic direction of substrate layer 15. Standard photolithographic masking techniques and standard chemical etching with stop-etch techniques are utilized in defining the rib waveguide and the periodic perturbation thereon. One suitable chemical etch and stop-etch technique is described in the *Technical Digest of IGWO* 1989, paper MDD2 by Koren et al.

The waveguide shown in FIG. 1 has a lateral dimension of approximately 3 μm. Each perturbation section in layers 13 and 14 has a width of approximately 1.5 μm measured in the transverse plane of the waveguide.

The period Λ of the perturbation sections in layers 13 and 14 is determined according to the phase-matching condition between the TE and TM modes so that Λ equals $\lambda/\Delta N$ where λ is the propagation wavelength in the waveguide and ΔN is the difference between the effective refractive index for the TE mode (fundamental) and the effective refractive index for the TM mode (fundamental) in the waveguide. While the periodic asymmetric loading of the waveguide is shown to be applied via the top waveguide layers in FIG. 1, it is contemplated that a similar loading can be applied to the sides or bottom layer of the waveguide.

Polarization rotation is achieved through the use of the perturbation sections in layers 13 and 14. Each perturbation section produces a transverse lateral asymmetry in the portion of the waveguide corresponding to the particular perturbation section. This asymmetry rotates the primary waveguide axes out of a standard orientation into a slightly tilted orientation for the particular waveguide section. It is understood that the standard orientation of the primary waveguide axes is oriented parallel and perpendicular to the substrate. When the primary waveguide axes are rotated into the slightly tilted orientation, they remain orthogonal to each other but they are no longer oriented parallel and perpendicular to the substrate.

Each perturbation section induces a non-zero coupling coefficient between the TE and TM modes giving rise to a codirectional coherent coupling effect. As a result, within each portion of the waveguide under a perturbation section, some portion of the optical signal propagating in the waveguide is converted into the orthogonal polarization. This conversion is required in order to match the boundary conditions at the interface between the waveguide under adjacent perturbation sections. It is presently understood that when the perturbations are applied asymmetrically and periodically, complete conversion can be achieved from one polarization to the orthogonal polarization. That is, it is possible to perform polarization rotation of 90°.

Figure 2A:
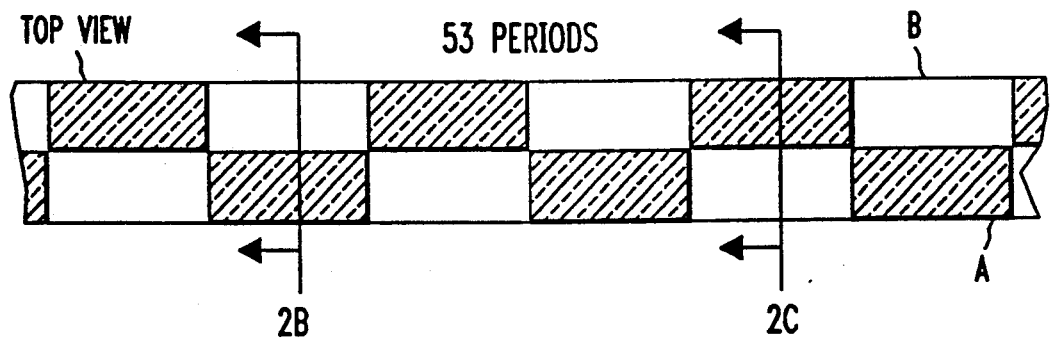
Figure 2B:
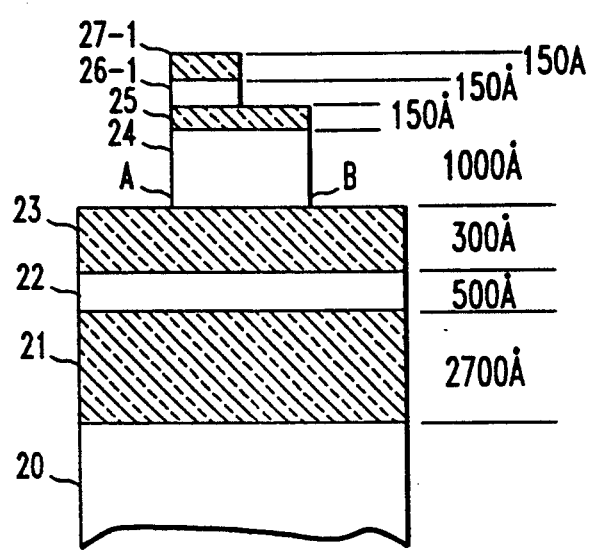
Figure 2C:
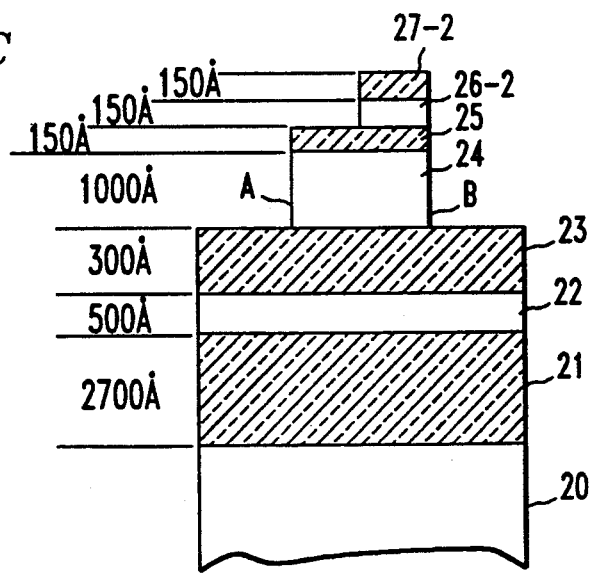

FIG. 2 shows a top view and two cross-sectional views of an exemplary embodiment of the asymmetric, periodically loaded semiconductor waveguide for polarization rotation realized in accordance with the principles of the present invention. Rib walls labelled A and B are shown to assist in orienting the top and cross-section views.

In the waveguide shown in FIG. 2, the waveguide core includes layers 21, 22, and 23 and resides on the InP substrate 20. Lateral confinement of the optical signal is obtained from the presence of layers 24 and 25. Periodic, asymmetric perturbation of the waveguide is achieved by perturbation sections including layers 26-1 and 27-1 and layers 26-2 and 27-2 which combine to form a single period in the fifty-three period perturbation structure.

Layer 21 is 0.27 μm thick InGaAsP having a bandgap wavelength of 1.3 μm (1.3Q); layer 22 is 0.05 μm InP; layer 23 is 0.03 μm thick InGaAsP having a bandgap wavelength of 1.3 μm (1.3Q); layer 24 is 0.1 μm InP; layer 25 is 0.015 μm thick InGaAsP having a bandgap wavelength of 1.3 μm (1.3Q); layer 26-1 and layer 26-2 are 0.015 μm InP; and layers 27-1 and 27-2 are 0.015 μm thick InGaAsP having a bandgap wavelength of 1.3 μm (1.3Q). The lateral width of layer 24 is approximately 3.0 μm. Period Λ of the perturbation is 70–80 μm.

Figure 3:
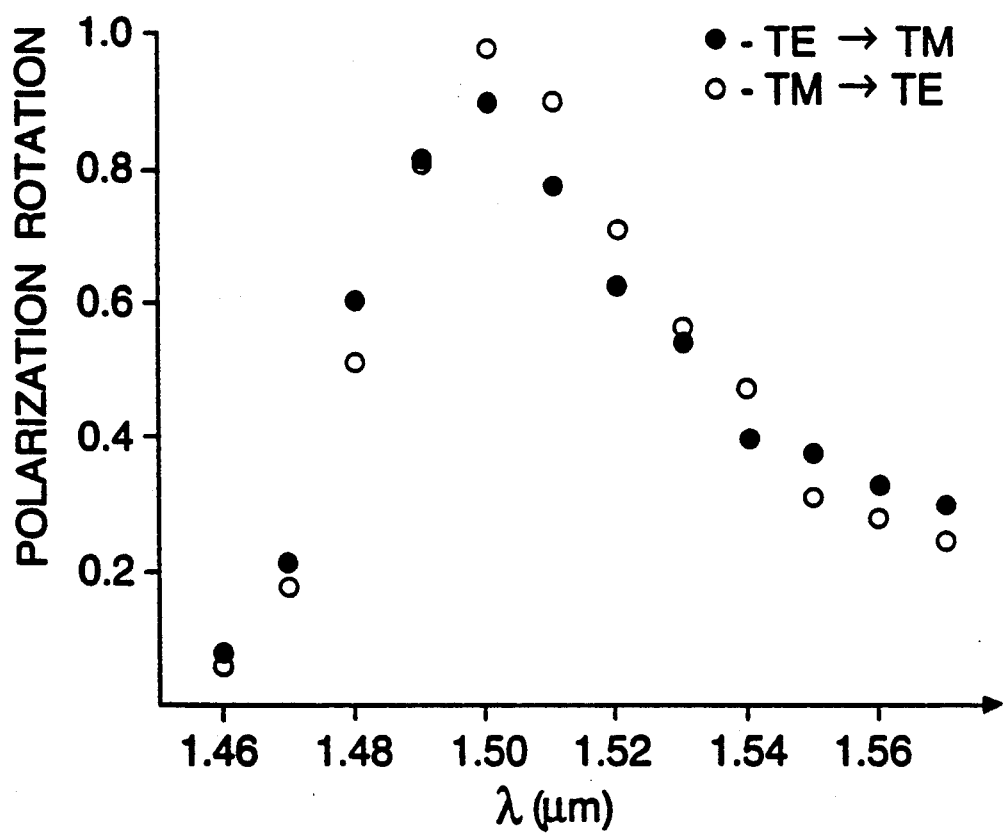
FIGS. 3, 5, and 7 show the polarization rotation performance of the waveguides in FIGS. 2, 4, and 6, respectively, as a function of wavelength.

As shown in FIG. 3, polarization rotation for the device of FIG. 2 achieved a maximum of 90% to 100% for both polarizations (TE and TM) in the vicinity of 1.50 μm. Output light from the device was observed to be in the fundamental mode. This waveguide is also capable of supporting the first order TE mode. In contrast with the polarization rotation achieved by this device, a straight waveguide of similar length without periodic, asymmetric loading was capable of only less than 1% polarization rotation.

Figure 6A:
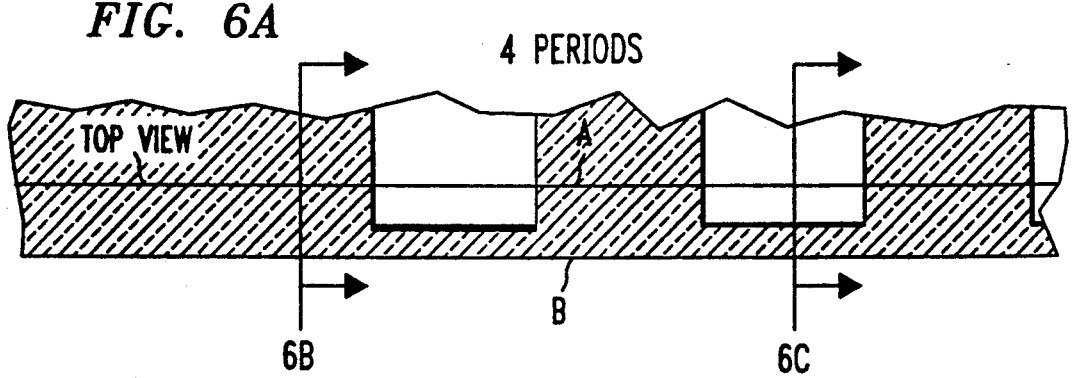
Figure 6B:
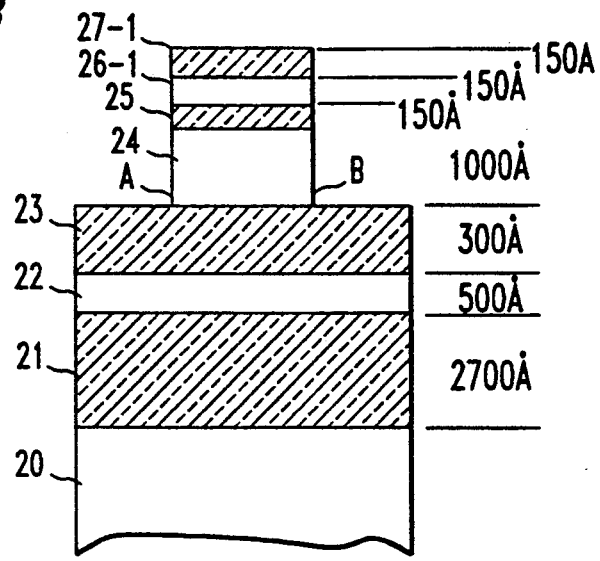
Figure 6C:
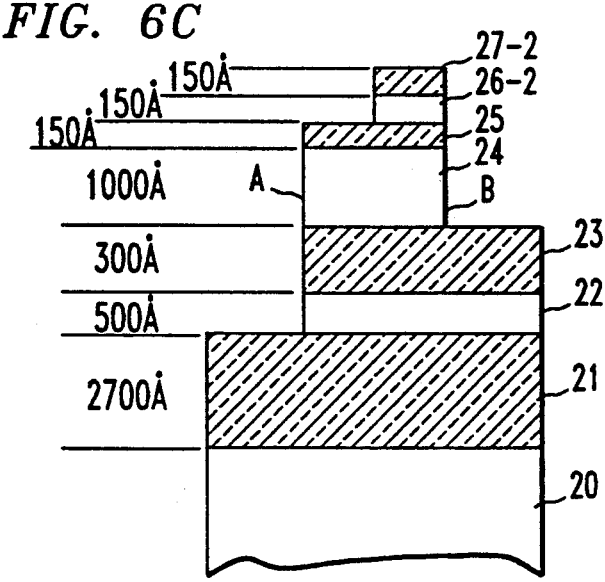
Figure 7:
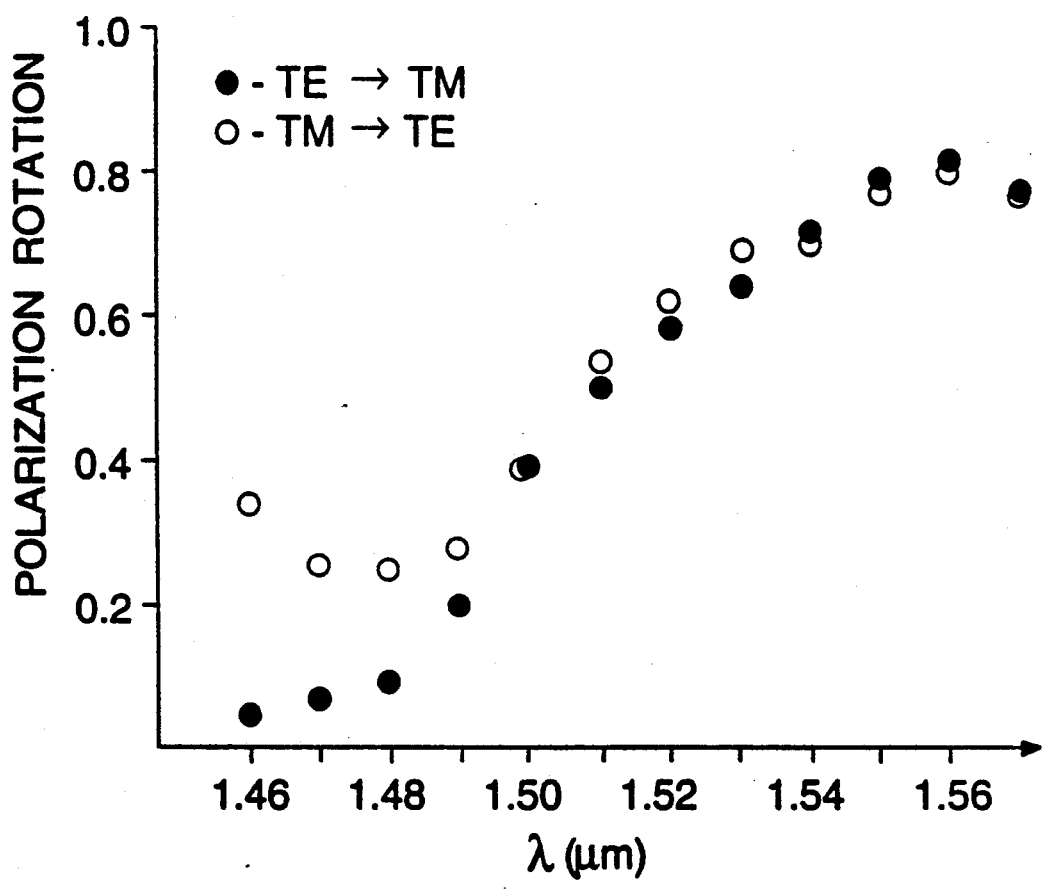

In the semiconductor layer structure shown in FIGS. 4 and 6 it is substantially identical to the semiconductor structure described in the relation to FIG. 2. Additional masking and etching is performed to remove portions of layers 22 and 23 which extend laterally beyond sidewall A. This causes the perturbation to appear consistently on only one side of the waveguide in the upper two layers, layers 26 and 27, and in lower layers 22 and 23. In this way, a standard waveguide (left cross-section of FIGS. 4 and 6) is alternated with an asymmetrically loaded waveguide (right cross-section of FIGS. 4 and 6) in a substantially periodic manner.

Figure 5:
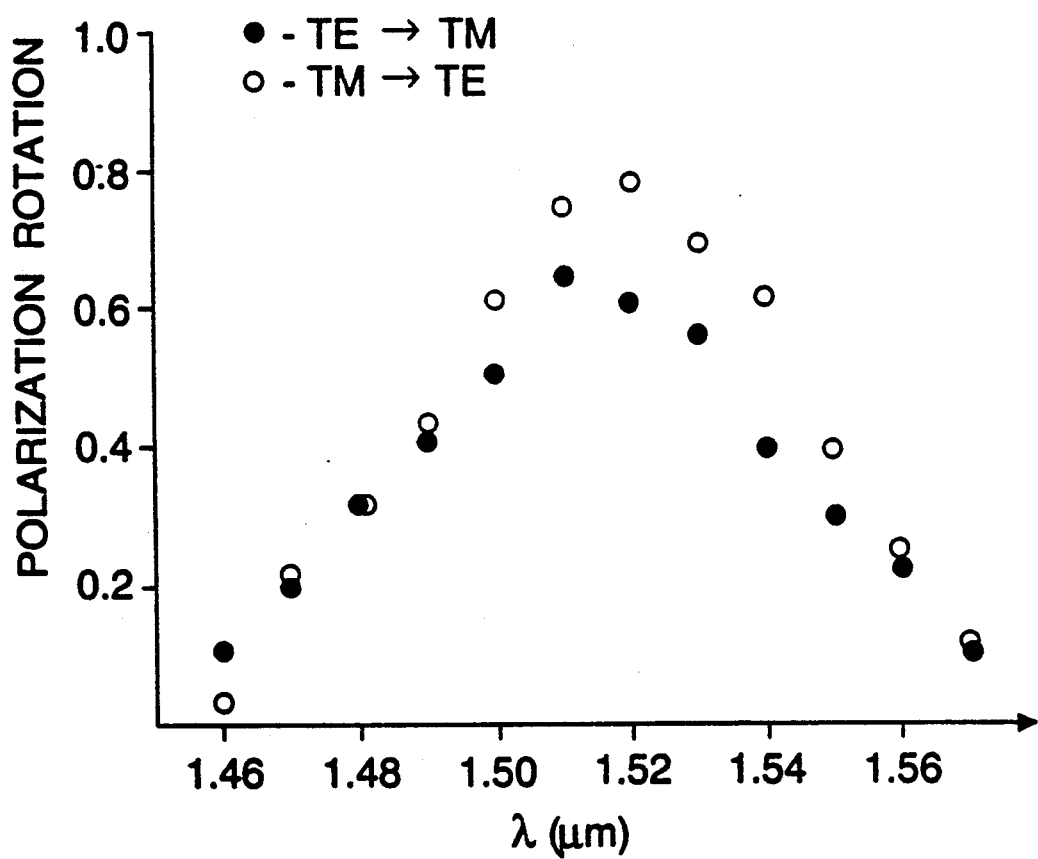

Thirty-three periods of the perturbation are used in the device of FIG. 4. As shown in FIG. 5, maximum polarization rotation of approximately 60% to 80% was achieved for both polarizations in the vicinity of 1.52 μm for the device in FIG. 4. The total length of the region containing the perturbations in the device used to achieve the above results was approximately 2.3 mm. The longitudinal portion of the device containing the perturbations is referred to as the interaction length.

A much shorter device structure is shown in FIG. 6 wherein only 4 periods of perturbation are employed to create an interaction length of approximately 0.28 mm. A slight modification of layers 26-1 and 26-2 is shown in this structure wherein the layer thickness is approximately 0.05 μm. With this device, the maximum polarization rotation of approximately 80% was achieved at a wavelength around 1.56 μm.

As presently understood, the mechanism for polarization rotation, that is, TE⟷TM mode conversion, is codirectional coupling. It is unlikely that the mechanism or polarization rotation at each periodic section is related to the electrooptic effect or the photo-elastic effect. This observation follows from the fact that an electrooptic effect is not capable of creating such a strong polarization rotation effect because InP exhibits a small electrooptic coefficient and there is very small confinement (less and 1%) of the field at the layers including the perturbation sections atop the waveguide. Additionally, while some polarization rotation may be obtained through the photo-elastic effect as a result of shear-strain due to mismatched semiconductor layers, the degree of mismatch (less than 0.1%) for the semiconductor structure shown in the figures has been analyzed to produce a polarization rotation effect significantly smaller than the polarization rotation effect shown in the figures. Furthermore, periodic evaporation of a silicon dioxide thin film to replace the periodic structure of layers 26 and 27 created only a very weak polarization rotation indicative of the absence of a photo-elastic effect. Finally, the use of the periodic semiconductor perturbations on top of a buried rib waveguide also created only a very weak polarization rotation effect indicative of the absence of any photo-elastic effect.

Since polarization rotation is accomplished by asymmetrically loading the refractive index of the waveguide, it is possible to design short polarization rotation devices which have higher excess loss but relatively few periods of a strong perturbation. Similarly, it is possible to design long polarization rotation devices which have very small excess loss over many periods of a weak perturbation.

Layers 26 and 27 were replaced by a different material having a comparable refractive index and thickness. Particularly, a 0.05 $\mu$m evaporated silicon layer was used in place of layers 26 and 27. The index of refraction for the evaporated silicon layer was approximately 3.5. For a device having an interaction length of 2.6 mm using the evaporated silicon perturbations, a maximum polarization rotation of 75% was obtained. This result is in contrast with a maximum polarization rotation of 2% obtained when the perturbation structure was replaced by perturbations comprising a 0.2 $\mu$m thick evaporated silicon dioxide layer having an index of refraction of 1.45, which is significantly different from the index of 3.2 for the replaced semiconductor layers. In view of the results from these substitutions, it is contemplated that similar polarization rotation can be achieved from other waveguides such as lithium niobate, glass and other Group III-V semiconductor materials using the asymmetric, periodic loading described above. It is also contemplated that implantation and/or diffusion of high and low refractive index materials in the periodically asymmetric manner taught above can be used to realize alterative embodiments of the inventive polarization rotation device. Such implantation and diffusion is contemplated as being performed in the top layers of the waveguide, the bottom layers of the waveguide, or both the top and bottom layers of the waveguide.

Reproducibility of the polarization rotation devices is effected by waveguide parameters and propagation wavelength. In order to achieve a reproducibly controllable amount of polarization rotation, it is contemplated that the refractive index of the waveguide be electrically controlled to produce a lateral shift of the optical mode from the center of the waveguide thereby changing the coupling between the optical mode and the perturbation of the waveguide. This is accomplished by electrically contacting the devices shown in FIGS. 1, 2, 4, and 6 on one side of the waveguide using standard metallic contacting techniques. Either current injection to produce a free carrier plasma index change or reverse bias producing the electrooptic effect can be used to vary the refractive index.

The top views of each of the asymmetrically loaded waveguides clearly depict the asymmetry of the loading. In FIG. 2, a periodic perturbation is applied in an alternating manner to each side of the waveguide in succession. That is, the perturbation sections alternate from one side of the waveguide to the other causing a "rocking" effect as the waveguide is traversed along its longitudinal axis. In FIGS. 4 and 6, the periodic perturbation is also applied in an alternating manner to each side of the waveguide. However, in alternating the perturbation from side to side, it is clear that the perturbation has a different and, perhaps, stronger polarization rotation effect on one side of the waveguide as opposed to the effect on the opposite side of the waveguide.

In the description above, the perturbation sections have been described in various exemplary embodiments as conforming to a periodic structure. It is contemplated that variations from strict periodicity are within the spirit and scope of the present invention. Such variations include, but are not limited to, multiple period, variable period such as chirp period, and the like.

While the lateral extent (width) of each perturbation section is shown in the drawings corresponding to approximately one-half the width of the rib waveguide, it is contemplated that the lateral extent of each perturbation can be also greater than or less than one-half the width of the rib waveguide.

Asymmetry of the refractive index cross-sectional profile has been shown and described above as being achieved by altering the spacial distribution of the refractive index primarily in one quadrant. Asymmetry can also be achieved in the practice of this invention by altering the spatial distribution of the refractive index in more than one quadrant such as the alteration in diametrically opposite (antipodal) quadrants.

While a particular type of optical waveguide has been described above, neither the shape of the waveguide nor type of waveguide is understood to be limited thereby.

What is claimed is:

1. An optical polarization rotation device comprising:
a waveguide having a longitudinal axis and supporting propagation of first and second orthogonal modes; and
means integrated with at least one surface of the waveguide for inducing coupling from the first mode to the second mode and vice versa along at least a longitudinal portion of the waveguide, said means for inducing coupling by altering a refractive index cross-section profile for the portion of the waveguide via asymmetric geometrical refractive index loading so that primary waveguide axes are rotated out of a standard orientation and into a tilted orientation.

2. The optical polarization rotation device as defined in claim 1 wherein the inducing means further includes a first plurality of refractive index changing elements all disposed over at least one quadrant of the waveguide, each element being spaced apart from adjacent elements.

3. The optical polarization rotation device as defined in claim 2 wherein each element is spaced apart from an adjacent element by a predetermined distance $\Lambda$ substantially equal to $\lambda/\Delta N$ where $\lambda$ is the propagation wavelength for the waveguide and $\Delta N$ is the difference between the effective refractive index for the first orthogonal mode and the effective refractive index for the second orthogonal mode.

4. The optical polarization rotation device as defined in claim 2 wherein the inducing means further includes a second plurality of refractive index changing elements all disposed substantially over at least one different quadrant of the waveguide from the first plurality of elements, the longitudinal portions of the waveguide corresponding to the first plurality of elements being interleaved with the longitudinal portions corresponding to the second plurality of elements.

5. The optical polarization rotation device as defined in claim 4 wherein each element in the second plurality is spaced apart from an adjacent element of the second plurality by the predetermined distance $\Lambda$.

6. The optical polarization rotation device as defined in claim 1 wherein the inducing means further includes electrode means connected thereto for controlling polarization rotation of the device to a predetermined amount.

7. The optical polarization rotation device as defined in claim 1 wherein the waveguide is a semiconductor rib waveguide and the inducing means includes a first semiconductor layer.

8. The optical polarization rotation device as defined in claim 1 wherein the waveguide is a semiconductor rib waveguide and the inducing means includes a first dielectric layer.

9. An optical polarization rotation device comprising:
a waveguide having first and second primary waveguide axes orthogonal to each other in a first orientation; and
means integrated with a lateral portion of the waveguide for rotating the orientation of the first and second primary waveguide axes to a second orientation along a longitudinal portion of the waveguide, said rotating means comprising spatial variations in the refractive index distribution of the waveguide.

10. An optical polarization rotation device comprising:
a waveguide including a plurality of first sections alternated along a waveguide longitudinal axis with a plurality of second sections wherein each of said first and second sections exhibit first and second primary waveguide axes orthogonal to each other, the axes being in a first orientation in each of said first sections and in a second orientation in each of said second sections, said second orientation being rotated from said first orientation, each of said sections including spatial variations of the refractive index distribution of the waveguide in the respective section for accomplishing the rotation of the waveguide axes.

11. The optical polarization rotation device as defined in claim 10 wherein each second section further includes means for perturbing a refractive index cross-section profile substantially in a predetermined quadrant substantially throughout said second section.

12. The optical polarization rotation device as defined in claim 11 wherein each first section further includes means for perturbing a refractive index cross-section profile substantially in a predetermined quadrant substantially throughout said first section.

* * * * *